(12) United States Patent
Sugiyama et al.

(10) Patent No.: US 7,088,875 B2
(45) Date of Patent: Aug. 8, 2006

(54) OPTICAL MODULATOR

(75) Inventors: Masaki Sugiyama, Kawasaki (JP); Tadao Nakazawa, deceased, late of Zama (JP); by Yumi Nakazawa, legal representative, Zama (JP)

(73) Assignee: Fujitsu Limited, Kawasaki (JP)

( * ) Notice: Subject to any disclaimer, the term of this patent is extended or adjusted under 35 U.S.C. 154(b) by 28 days.

(21) Appl. No.: 10/872,404

(22) Filed: Jun. 22, 2004

(65) Prior Publication Data

US 2005/0175271 A1 Aug. 11, 2005

(30) Foreign Application Priority Data

Feb. 6, 2004 (JP) .............................. 2004-031038

(51) Int. Cl.
*G02F 1/035* (2006.01)

(52) U.S. Cl. ................................. 385/3; 385/8; 385/45

(58) Field of Classification Search ................ 385/2, 385/3, 4, 8, 39–45; 359/238–297; 367/140–149
See application file for complete search history.

(56) References Cited

U.S. PATENT DOCUMENTS 6,678,428 B1 * 1/2004 Seino et al. .................... 385/2
6,853,758 B1 * 2/2005 Ridgway et al. ............... 385/2

FOREIGN PATENT DOCUMENTS

JP        11-167032        6/1999

OTHER PUBLICATIONS

I.E. Barry, et al., "Ridge Waveguides In Lithium Niobate Fabricated By Differential Etching Following Spatially Selective Domain Inversion", Applied Physics Letters, vol. 74, No. 10, Mar. 8, 1999, pp. 1487-1488.

* cited by examiner

*Primary Examiner*—Phan Palmer
(74) *Attorney, Agent, or Firm*—Staas & Halsey LLP

(57) ABSTRACT

An object of the invention is to provide a Mach-Zehnder type optical modulator that can reduce wavelength chirp occurring in a modulated light, and also can reduce an optical loss with a small sized configuration. To this end, according to the present Mach-Zehnder type optical modulator, in a configuration where optical waveguides and a coplanar electrode are formed on a substrate having an electro-optical effect, a polarization inversed region is formed in a part of an interaction portion of the substrate, and a signal electrode is arranged above one of parallel waveguides in a polarization inversed region and is arranged above the other parallel waveguide in a non-inversed region. Furthermore, a surface area of the substrate positioned on both sides of each of the parallel waveguides is lowered to provide a ridge structure section, and a buffer layer is formed on a ridge side face thereof.

29 Claims, 8 Drawing Sheets

FIG.2
(A) A-A' CROSS SECTION
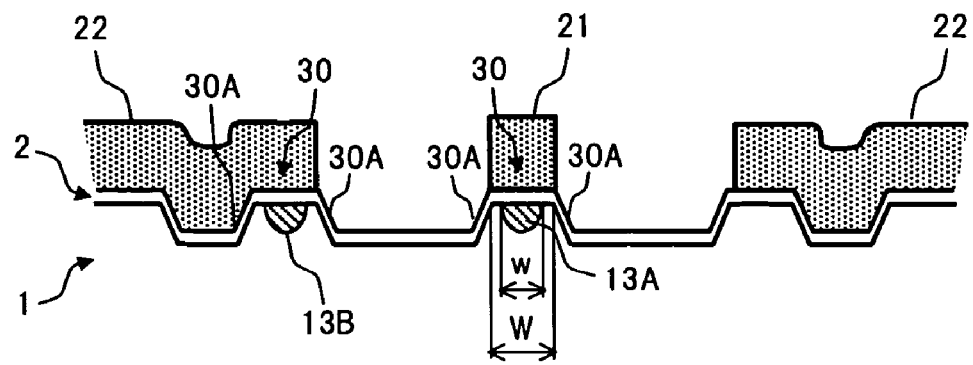
(B) B-B' CROSS SECTION
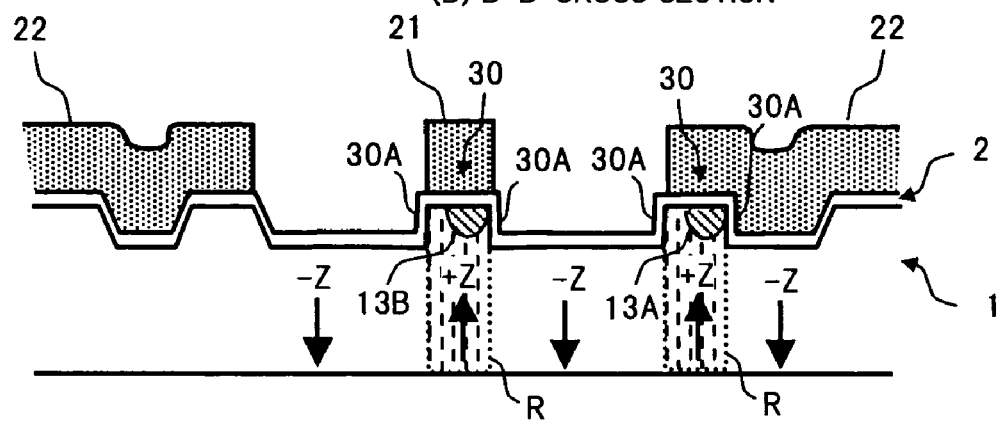

OPTICAL MODULATOR

BACKGROUND OF THE INVENTION

1. Field of the Invention

The present invention relates to an optical waveguide device to be used for optical communications, and in particular, relates to a Mach-Zehnder type optical modulator.

2. Description of the Related Art

For example, an optical waveguide device in which an electro-optic crystal such as lithium niobate ($LiNbO_3$), lithium tantalite ($LiTaO_2$) or the like is used, is manufactured by forming a metal film on a part of a crystal substrate to perform thermal diffusion or proton exchange in benzoic acid after patterning, thereby forming an optical waveguide, and afterwards providing electrodes in the vicinity of the optical waveguide. A Mach-Zehnder type optical modulator with a branching interference type optical waveguide structure is known as one of optical waveguide devices using such electro-optical crystal.

FIG. 6 is a plan view showing the structure of a typical Mach-Zehnder type optical modulator. In this Mach-Zehnder type optical modulator, an optical waveguide 110 is formed such that a titanium (Ti) film is formed on a substrate 101, patterned in a Mach-Zehnder shape, and afterwards heated for seven to ten hours at 1050° C. to be subjected to the thermal diffusion. This optical waveguide 110 comprises an incoming waveguide 111, a branching section 112, parallel waveguides 113A and 113B, a multipplexing section 114, and an outgoing waveguide 115. A coplanar electrode 120 comprising a signal electrode 121 and a ground electrode 122 is provided along the parallel waveguides 113A and 113B. In the case where a Z-cut substrate 101 is used, in order to utilize a change in refractive index due to an electric field in a Z direction, the signal electrode 121 is positioned just above the optical waveguide 113A. Further, the signal electrode 121 and the ground electrode 122 are formed on the substrate 101 via a buffer layer (not shown in the figure) formed of silicon oxide ($SiO_2$) or the like, in order to prevent the absorption of lights which are propagated through the parallel waveguides 113A and 113B.

In the case where such a conventional Mach-Zehnder type optical modulator is driven at a high speed, one end of the signal electrode 121 is grounded via a resistor (not shown in the figure) to be made a traveling-wave electrode, and a high frequency electrical signal M, such as a microwave or the like, is applied from the other end of the signal electrode 121. At this time, since the refractive indexes of the parallel waveguides 113A and 113B are both changed due to an electric field generated between the signal electrode 121 and the ground electrode 122, phase differences of the lights being propagated through the parallel waveguides 113A and 113B are changed, and an intensity modulated optical signal is output from the outgoing waveguide 115.

For the above described conventional Mach-Zehnder type optical modulator, it has been known that by changing the cross-section of the signal electrode 121 to control the effective refractive index of microwave, and matching propagation speeds of the light and the microwave, broadband optical response characteristics can be obtained. Furthermore, as shown in FIG. 7 and FIG. 8 for example, by providing a curved section 110A in a part of the optical waveguide 110 to form an approximately U-shaped or S-shaped optical waveguide 110, it is possible to achieve the miniaturization (especially, miniaturization in the longitudinal direction) of the substrate 101.

In the case where the curved section is formed in the part of the optical waveguide, an optical loss (radiation loss) occurring in the curved section is a problem. Conventionally, a technique has been proposed for reducing the loss in the curved section of optical waveguide, in which a reflecting section is disposed on an outer periphery of the curved section, to again couple the light emitted from the curved section in the optical waveguide (refer to Japanese Unexamined Patent Publication No. 11-167032).

However, the above described conventional Mach-Zehnder type optical modulator has the following problems.

(1) Problem Regarding Wavelength Chirp

In the conventional Mach-Zehnder type optical modulator, since the intensity of the electric field applied to each of the parallel waveguides 113A and 113B differs from each other depending on a difference in arranged positions of the parallel waveguides 113A and 113B relative to the signal electrode 121, a change amount ($\Delta n_s$) of the refractive index of the parallel waveguide 113A, which is closer to the signal electrode 121, is greater than a change amount ($\Delta n_g$) of the refractive index of the parallel waveguide 113B, which is further from the signal electrode 121. Therefore, absolute values of the phase changes of the lights being propagated through the parallel waveguides 113A and 113B differ from each other. Thus, there is a problem in that when the signal is switched from "0" to "1" or from "1" to "0", a wavelength change (wavelength chirp) in a modulated light occurs, which degrades the signal waveform after transmission.

In order to reduce the wavelength chirp, for example there is a method in which an X-cut crystal substrate is used, or a method in which two signal electrodes are arranged on the respective parallel waveguides to push-pull drive the Mach-Zehnder type optical modulator.

In the case where the X-cut crystal substrate is used, by applying electric fields to the two parallel waveguides in a +Z direction and a −Z direction utilizing an electric field parallel to the substrate, it becomes possible to perform modulation whereby the wavelength chirp does not occur. However, since it is not possible to arrange the parallel waveguides directly below the signal electrode, there is a large distance between the signal electrode and the waveguides. Therefore, there is a disadvantage in that a high drive voltage must be applied.

Furthermore, in the case where the push-pull drive is performed using two signal electrodes, two input connectors for high frequency electrical signals are required, and also electrical signals with their data inverted must be applied to the two signal electrodes, while their phases being controlling. Therefore, there is a disadvantage in that the circuit structure of drive system becomes complicated.

(2) Problem Regarding Miniaturization

In order to miniaturize the Mach-Zehnder type optical modulator, even if the curved section is formed in the part of the optical waveguide, and furthermore, the optical loss occurring in the curved section is suppressed using the above described technique of Japanese Unexamined Patent Publication No. 11-167032, it is difficult to reduce the curvature of the curved section of the optical waveguide. Therefore, there is a problem in that miniaturization of the optical modulator is limited. For example, in the case where the curvature of the curved section of the optical waveguide is made small as approximately a few mm, the lights are not again coupled sufficiently by the reflecting section, and hence the optical loss is increased significantly. In the case where the curvature of the curved section of the optical waveguide cannot be made small in this manner, it is difficult to make the whole of the optical waveguide small, which leads to a limitation to the miniaturization of optical modulator.

Here, for the above described problem (1), the inventor of the present application has proposed a technique for reducing the wavelength chirp occurring in the modulated light, by forming a polarization inversed region in a part of a portion where the lights being propagated through the parallel waveguides and the microwave being propagated through the signal electrode interact, arranging the signal electrode above one of the parallel waveguides in the polarization inversed region, and arranging the signal electrode above the other parallel waveguide in a non-inversed region, and thereby offsetting the difference between the amounts of phase change of the lights being propagated through the two parallel waveguides (refer to a prior application, International Application No. PCT/JP02/12824). However, this prior invention has not show a specific configuration in which the curved section is formed in the part of the optical waveguide as described above, and a problem remains regarding the miniaturization of optical modulator.

Further, for the above problem (2), a technique has been proposed for miniaturizing an optical device, by lowering areas of the substrate on both sides of the curved optical waveguide along the curved section shape to form a ridge structure section, and forming a buffer layer on at least a side face of the ridge structure section that faces the curved section by the use of a material whose refractive index is lower than the refractive index of the substrate, so that it is possible to reduce the radiation loss or the like even if the curvature of the curved section is small (refer to a prior application, Japanese Patent Application 2003-079116,). However, this prior invention leaves a problem regarding the above described wavelength chirp. Moreover, by forming the ridge structure section, the substrate under the signal electrode has a side face inclined diagonally. Therefore, there is a problem in that the design for matching the speeds of the lights being propagated through the optical waveguides and the speed of the microwave being propagated through the signal electrode becomes complicated.

SUMMARY OF THE INVENTION

The present invention has been accomplished in view of the above described problems, with an object of providing a Mach-Zehnder type optical modulator that can reduce wavelength chirp occurring in a modulated light, and also can reduce an optical loss with a small sized configuration.

In order to achieve the above object, according to the present invention, there is provided an optical modulator of Mach-Zehnder type in which an optical waveguide with a structure of a Mach-Zehnder interferometer is formed on a surface of a substrate having an electro-optical effect, a signal electrode and a ground electrode are disposed along a pair of parallel waveguides positioned between a branching section and a multiplexing section of the optical waveguide, and lights being propagated through the optical waveguide are modulated by applying an electrical signal to the signal electrode. In an interaction portion where the lights being propagated through the pair of parallel waveguides and the electrical signal being propagated through the signal electrode interact, the substrate includes: a polarization inversed region, which is formed by inversing a direction of polarization of a part of a region relative to a direction of polarization of another part of the region; and ridge structure sections formed by lowering areas of the substrate on both sides of each of the pair of parallel waveguides along the parallel waveguides. Furthermore, the signal electrode is arranged in the vicinity of one of the pair of parallel waveguides in the polarization inversed region of the interaction portion, and is arranged in the vicinity of the other parallel waveguide in a non-inversed region of the interaction portion where the polarity is not inversed.

In the optical modulator with such a configuration, the light incident on the optical waveguide is branched into two by the branching section, and respectively sent to the pair of parallel waveguides. An electric field generated between the signal electrode and the ground electrode is applied to both parallel waveguides according to the electrical signal being propagated through the signal electrode, refractive indexes of the parallel waveguides are changed due to the electro-optical effect caused by this electric field, and phases of the lights being propagated through the parallel waveguides are changed. At this time, a polarization inversed region and a non-inversed region, whose directions of polarization are opposed to each other, are formed in the interaction portion, and the arrangement of the signal electrodes in the pair of parallel waveguides are different in each region. Therefore, a difference between amounts of phase change of the lights being propagated through the parallel waveguides is offset, and wavelength chirp occurring in a modulated light multiplexed in the multiplexing section is reduced. Further, since the ridge structure section is formed along each propagation direction of the lights, so that air is cladding, the difference between the refractive indexes of the lights being propagated through the pair of parallel waveguides becomes large in a direction perpendicular to the propagation directions of the lights, thereby suppressing a radiation loss.

Moreover, in the above optical modulator, a buffer layer with a lower refractive index than a refractive index of the substrate may be formed on at least a side face of the ridge structure section. As a result, it is also possible to suppress a scattering loss due to roughness of the side face of the ridge structure section.

Furthermore, the above optical waveguide may include a curved section with a return angle of 90° or more in a portion corresponding to the interaction portion, and the ridge structure section may be formed in at least an area corresponding to the curved section, on the surface of the substrate. According to such a configuration, since the curved section is disposed in the optical waveguide, it becomes possible to miniaturize the substrate, and since the ridge structure section is formed in an area corresponding to the curved section. it becomes possible to suppress the radiation loss of the light being propagated through the optical waveguide even if the curvature of the curved section is small. In addition, in the above curved section, the center position of the optical waveguide may be arranged to shift from the center of the ridge structure section in a direction parallel to the surface of the substrate and perpendicular to the propagation direction of light. Using such an arrangement, it is possible to suppress the radiation loss effectively.

Moreover, the polarization inversed region may have the length of approximately ½ times the overall length of the interaction portion in the propagation directions of the lights in the pair of parallel waveguides, and have the length approximately equal to the width of the ridge structure section in a direction perpendicular to the propagation directions of the lights. As a result, phase modulation can be performed in the polarization inversed region and non-inversed region, in which absolute values are almost equal, but signs are inversed. Therefore, a modulated light whose wavelength chirp is almost zero, is generated.

Furthermore, for the substrate of the optical modulator, it is preferable that the optical waveguide is formed on a surface of a Z-cut crystal substrate, and the surface on which the optical waveguide is formed, has a +Z face in the polarization inversed region and a −Z face in the non-inversed region. In such a configuration, by lowering the substrate to form the ridge structure section, the perpendicularity of the side face of the ridge structure section in the polarization inversed region is improved, so that the radiation loss is suppressed more effectively.

Other objects, features and advantages of the present invention will become apparent in the following description of embodiments, in conjunction with the appended drawings.

BRIEF DESCRIPTION OF THE DRAWINGS

FIG. 2 is a diagram showing main structures of cross-sections in respective sections of FIG. 1, where (A) is a cross-sectional diagram through A–A', and (B) is a cross-sectional diagram through B–B'.

DETAILED DESCRIPTION OF THE INVENTION

Figure 1:
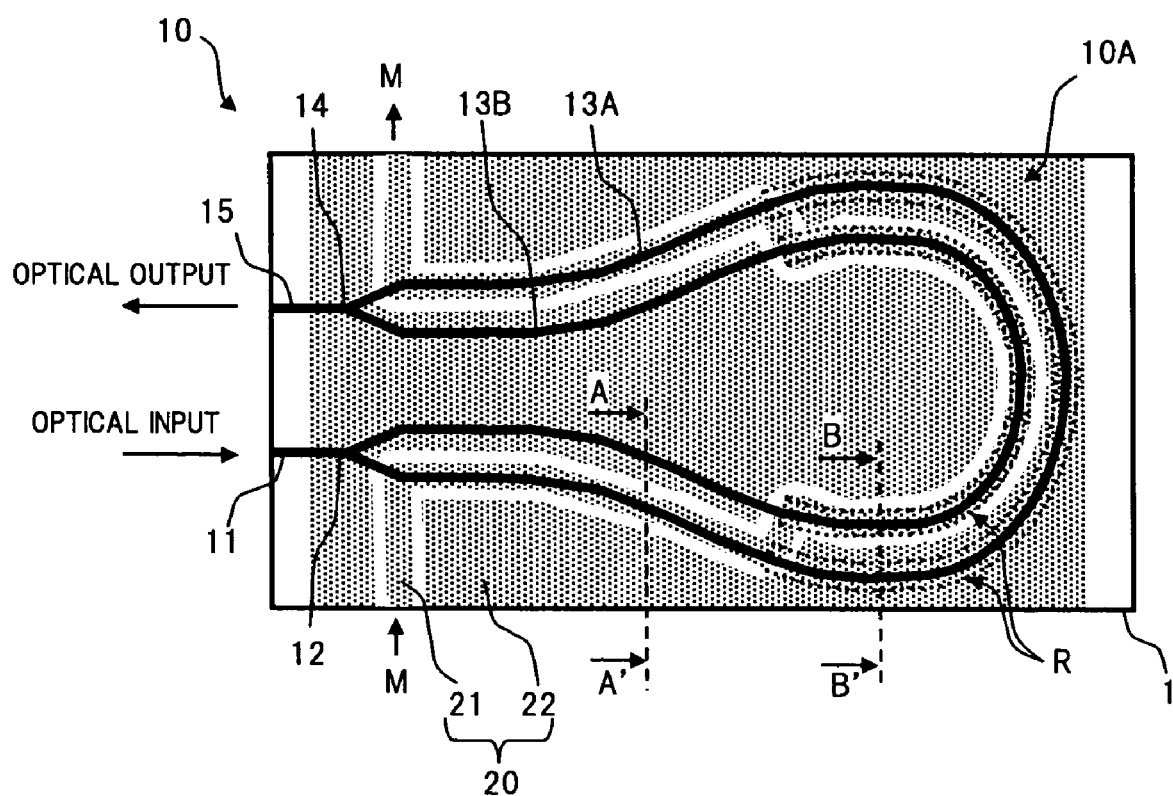
FIG. 1 is a plan view showing a configuration of a Mach-Zehnder type optical modulator according to an embodiment of the present invention.

Hereunder is a description of embodiments of implementing an optical modulator of the present invention with reference to the appended figures. Here, identical reference numerals denote identical or equivalent parts throughout all of the drawings.

FIG. 1 is a plan view showing a configuration of a Mach-Zehnder type optical modulator according to an embodiment of the present invention. Further, FIG. 2 is a diagram showing main structures of cross-sections in respective sections of FIG. 1, where (A) is a cross-sectional diagram through A–A', and (B) is a cross-sectional diagram through B–B'.

In FIG. 1 and FIG. 2, the Mach-Zehnder type optical modulator of the present embodiment comprises a substrate 1 having an electro-optical effect, an optical waveguide 10 formed on a surface of the substrate 1, and a coplanar electrode 20 formed on the surface of the substrate 1 via a buffer layer 2.

For the substrate 1, a Z-cut lithium niobate ($LiNbO_3$) substrate, a lithium tantalite ($LiTaO_2$) substrate or the like is used. After forming the optical waveguide 10 on a −Z face of this substrate 1 by applying a known treatment such as titanium (Ti) diffusion or proton exchange on the −Z face, directions of polarization in regions R enclosed by dotted lines in FIG. 1 and (B) of FIG. 2 are inversed relative to a direction of polarization in other regions, and further, both sides of each of parallel waveguides 13A and 13B are lowered as in (A) and (B) of FIG. 2 to form ridge structure sections 30. Here, the regions R in each of which the polarization is inversed are designated as polarization inversed regions, and the other regions in each of which the polarization is not inversed are designated non-inversed regions.

The polarization inversed regions R are formed by patterning by resist or the like, and then applying a pulsed high electric field, for example. In the case where the overall length in a longitudinal direction (propagation direction of light) of a portion (referred to hereunder as interaction portion) where a light being propagated through the optical waveguide 10 and a microwave being propagated through the coplanar electrode 20 is L, the length of each of the polarization inversed regions R is about L/2. Further, the length thereof in a direction perpendicular to the propagation direction of light is approximately equal to the width W of the ridge structure section 30, and the length thereof in a depth direction of the substrate 1 is long enough to cover the interaction portion (passing through the substrate 1 here). By forming such polarization inversed regions R, as shown in the crystal orientation indicated by arrows of solid lines in (B) of FIG. 2, the non-inversed regions have the −Z faces, and the polarization inversed regions R have +Z faces on the surface of the substrate 1 on which the optical waveguide 10 is formed.

The ridge structure sections 30 are each formed by etching the substrate 1 using typical reactive ion etching (RIE) or the like. The depth of each of the ridge structure sections 30 is set so as to be 3 μm or more, in the case where the power of light being propagated through the optical waveguide 10 becomes maximum at a position of about 3 μm from the surface of the substrate 1. In each of these ridge structure sections 30, air (refractive index 1) becomes equivalent to cladding, and there is a large difference between the air and the refractive index of the substrate 1 (refractive index 2.2) in the direction perpendicular to the propagation direction of light. Therefore, it is possible to suppress a radiation loss of light, even if the curvature of a curved section 10A of the optical waveguide 10 is made small. In particular, in the ridge structure sections 30 corresponding to the polarization inversed regions R, it has been known that the perpendicularity of ridge side faces 30A is improved since an etching speed of the substrate 1 is different between the +Z face and the −Z face (refer to the literature: Ian E. Barry et al., "Ridge waveguides in lithium niobate fabricated by differential etching following spatially selective domain inversion", Applied Physics Letters, Volume 74, Number 10, 8 Mar. 1999), and therefore, it is possible to suppress the radiation loss more effectively.

Note, in order to confine a field of light by the side face 30A, it is desirable to design the width W (refer to (A) of FIG. 2) of each of the ridge structure sections 30 to be +6 μm or less in the case of the optical waveguide with the width w of 5 to 9 μm for example. Furthermore, for a start point and end point of each of the ridge structure sections 30, to be specific, for portions thereof in the vicinity of a branching section 12 and a multiplexing section 14 of the optical waveguide 10, which will be described later, it is preferable that the ridge width is changed to be a tapered shape to prevent a coupling loss from occurring.

The buffer layer 2 is formed on the surface of the substrate 1, in order to prevent the light being propagated through the optical waveguide 10 from being absorbed by the coplanar electrode 20, and also prevent a scattering loss caused by the roughness of the side face 30A of each of the ridge structure sections 30. For the buffer layer 2, it is possible to use a material with a smaller refractive index than the refractive index of the substrate 1, for example silicon oxide ($SiO_2$) or titanium oxide ($TiO_2$), and preferably, the thickness of the buffer layer 2 is approximately 0.2 to 1 μm.

Figure 7:
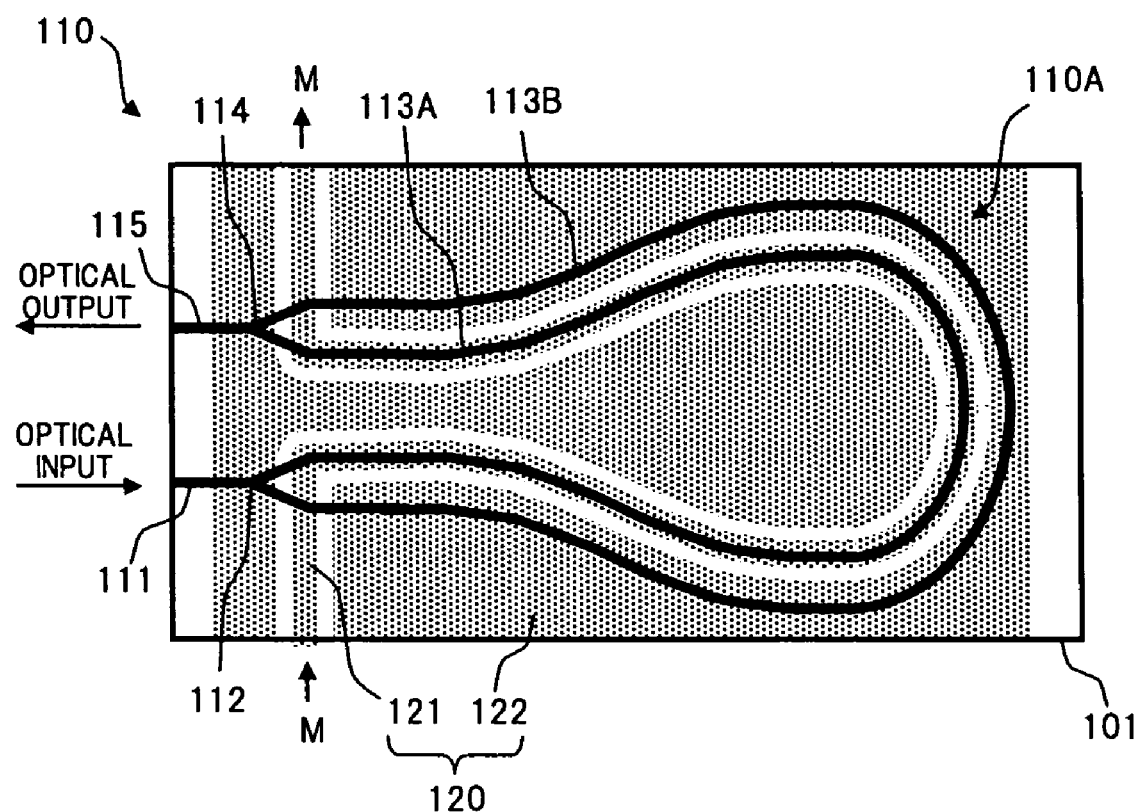
FIG. 7 is a plan view showing a configuration example of a conventional optical modulator in which a curved section is formed in a part of an optical waveguide for the purpose of miniaturization.
Figure 8:
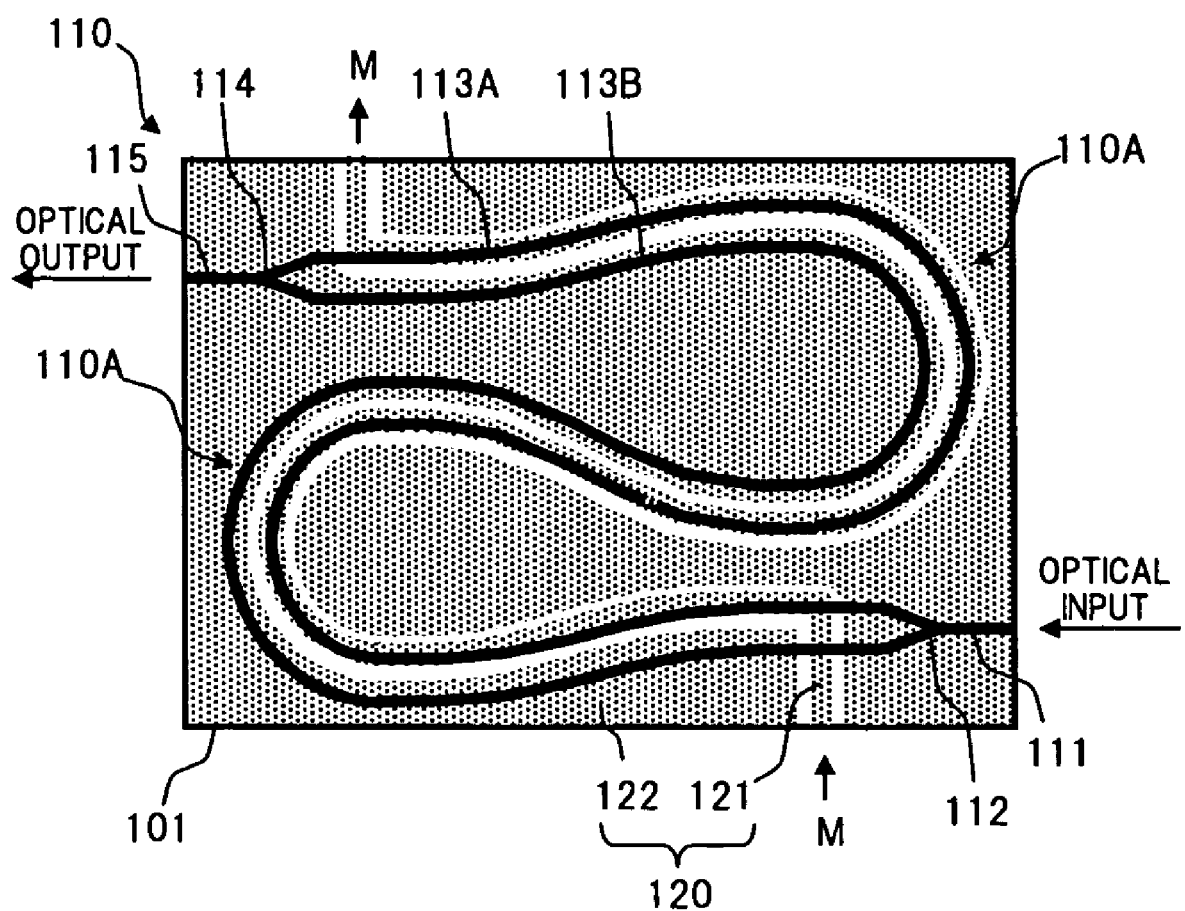
FIG. 8 is a plan view showing another configuration example of the conventional optical modulator in which a curved section is formed in a part of an optical waveguide for the purpose of miniaturization.

The optical waveguide 10 includes, similarly to the conventional configuration shown in FIG. 7, an incoming waveguide 11, the branching section 12, the parallel waveguides 13A and 13B, the multiplexing section 14, and an outgoing waveguide 15, to constitute a Mach-Zehnder interferometer. The curved section 10A of a shape bending around in an arc shape with a return angle of 180° is formed in a central part of each of the parallel waveguides 13A and 13B. At the curved section 10A, as shown in (B) of FIG. 2, each of the parallel waveguides 13A and 13B is arranged to be shifted outwards from the central position of the ridge structure section 30 (direction away from the center of the arc). In such an arrangement, an outer periphery of each of the parallel waveguides 13A and 13B approaches or makes contact with the side face 30A on the outside of the ridge structure section 30, and on the other hand, an inner periphery of each of the parallel waveguides 13A and 13B gets away from the side face 30A on the inside of the ridge structure section 30 by a predetermined distance. Here, in the present embodiment, the configuration has been such that the parallel waveguides 13A and 13B are shifted outwards from the ridge structure sections 30. However, they may also be shifted inwards.

A shift amount at this time is set to a predetermined amount in a direction in which the radiation loss of light being propagated through the curved section 10A can be reduced. In general, optical losses that are critical in an optical waveguide are a radiation loss and a scattering loss. In the above configuration, if the width W of the ridge structure section 30 is made small, although it is possible to reduce an influence of radiation loss, an influence of scattering loss is increased. On the other hand, if the width W of the ridge structure section 30 is made large, although it is possible to reduce the influence of scattering loss, the influence of radiation loss is increased. The scattering loss is caused by the roughness of the side face 30A of the ridge structure section 30. Accordingly, based on such conditions, the shift amount may be set appropriately so as to suppress the radiation loss to a minimum with no influence of the scattering loss.

The arrangement of each of the parallel waveguides 13A and 13B in the portion other than the curved section 10 (referred to hereunder as linear section) is designed such that each of the parallel waveguides 13A and 13B passes through the central position of the ridge structure sections 30 as shown in (A) of FIG. 2. For each of the parallel waveguides 13A and 13B positioned in this linear section, in order to have the excess length to connect between connectors at both ends of signal electrode 21 of the coplanar electrode 20 to be described later, a distance between the portion on the incoming waveguide 11 side and the portion on the outgoing waveguide 15 side is made closer. Correspondingly to this, the half of each of the parallel waveguides 13A and 13B positioned in this linear section, that faces the curved section 10A side, is not a linear shape, but is an arc shape connecting between the curved section 10A and the linear section.

However, the layout of the parallel waveguides 13A and 13B of the present invention is not limited to the above example.

The coplanar electrode 20 comprises the signal electrode 21 and a ground electrode 22. The signal electrode 21 is patterned in a required shape so as to pass above the parallel waveguide 13A in the non-inversed region of the substrate 1, and pass above the parallel waveguide 13B in the polarization inversed region R, as shown in FIG. 1 for example. On the other hand, the ground electrode 22 is patterned in a required shape so as to pass above the parallel waveguide 13B in the non-inversed region of the substrate 1, and pass above the parallel waveguide 13A in the polarization inversed region R, with a constant distance from the signal electrode 21. The signal electrode 21 is arranged such that the center of its width coincides with the center of the width of the ridge structure section 30 positioned below. Furthermore, the signal electrode 21 is grounded via a resistor (not shown in the figure) at an output terminal thereof positioned on the top side in FIG. 1, to be made a traveling-wave electrode, and a microwave M corresponding to modulation data is applied from an input terminal positioned on the bottom side in FIG. 1.

Next is a description of an operation of the Mach-Zehnder type optical modulator with the above configuration.

In the present optical modulator, a continuous light input from outside to the incoming waveguide 11 is branched into two by the branching section 12, and branched lights are respectively sent to the parallel waveguides 13A and 13B. An electric field generated between the signal electrode 21 and the ground electrode 22 is applied to each of the parallel waveguides 13A and 13B according to the microwave M traveling in the signal electrode 21, and due to the electro-optical effect caused by this electric field, the refractive indexes of the parallel waveguides 13A and 13B are changed. As a result, phases of the lights being propagated through the parallel waveguides 13A and 13B are changed.

At this time, if the polarization inversed regions R are formed so that the length L1 of the non-inversed regions and the length L2 of the polarization inversed regions R are almost equal to each other, that is, a relationship L1=L2=L/2 is satisfied as an ideal state, in the longitudinal direction (overall length L) of the interaction portion, the phase of the light being propagated through the parallel waveguide 13A is changed by $\theta_A$ as shown in the following equation (1), and the phase of the light being propagated through the parallel waveguide 13B is changed by $\theta_B$ as shown in the following equation (2).

$$\theta_A = (+\Delta n_S) \cdot L1 + (+\Delta n_G) \cdot L2 = +(\Delta n_S + \Delta n_g) \cdot L/2 \quad (1)$$

$$\theta_B = (-\Delta n_G) \cdot L1 + (-\Delta n_S) \cdot L2 = -(\Delta n_S + \Delta n_g) \cdot L/2 \quad (2)$$

Where $\Delta n_S$ is a change in the refractive index of the parallel waveguide positioned under the signal electrode 21, and $\Delta n_G$ is a change in the refractive index of the parallel waveguide positioned under the ground electrode 22.

As is apparent from the above equations (1) and (2), the phases of the lights being propagated through the parallel waveguides 13A and 13B are changed by $(+\Delta n_S) \cdot L1$, and $(-\Delta n_G) \cdot L1$, respectively, in the non-inversed regions, and changed by $(+\Delta n_G) \cdot L2$, and $(-\Delta n_S) \cdot L2$, respectively, in the polarization inversed regions. Accordingly, the phases of the lights that reach the multiplexing section 14 after having passed through the parallel waveguides 13A and 13B are changed by $+(\Delta n_S + \Delta n_G) \cdot L/2$, and $-(\Delta n_S + \Delta n_G) \cdot L/2$, leading the phase modulation in which the absolute values are equal, but the signs are inversed. As a result, it becomes possible to make the wavelength chirp, was occurred in the modulated light in the conventional Mach-Zehnder type optical modulator using the Z-cut substrate, almost zero.

Figure 3:
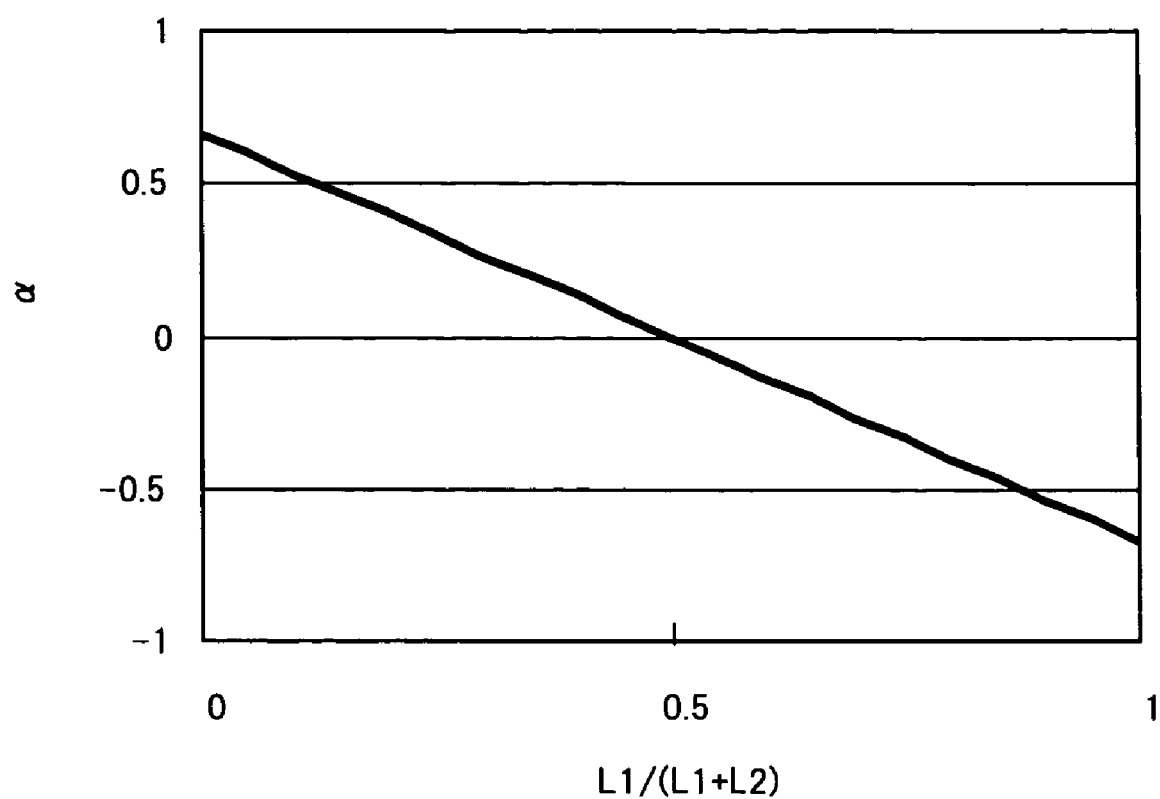
FIG. 3 is a diagram showing an example of a relationship between the length of a non-inversed region and wavelength chirp in the above embodiment.

FIG. 3 is a diagram showing an example of a relationship between the length of the non-inversed region (or polarization inversed region R) and the occurring wavelength chirp. Here, a ratio of the length L1 of the non-inversed regions to the overall length L (=L1+L2) of the interaction portion is on the horizontal axis, and a value of a parameter a indicating the occurring wavelength chirp is on the vertical axis. It is understood from FIG. 3 that if L1/L=0.5, that is, if the length L1 of the non-inversed regions and the length L2 of the polarization inversed regions R are equal to each other, the value of a parameter becomes zero, which shows that no wavelength chirp occurred.

Further, since the ridge structure sections 30 are formed along the propagation directions of the lights in the parallel waveguides 13A and 13B, the air in the parallel waveguides becomes cladding. Therefore, compared with the case where there is no ridge structure section 30 formed and the substrate 1 becomes cladding, there is a large difference between the refractive indexes in the direction perpendicular to the propagation direction of light. Thus, it becomes possible to suppress the radiation loss effectively even if the curvature of the curved section 11A is small. Moreover, in the curved section 10A, since the polarization inversed region R is formed along each of the parallel waveguides 13A and 13B, and the etching is performed, the perpendicularity of the side face of the ridge is improved, and hence the radiation loss is reduced further. In addition, since the buffer layer 2 is formed, also the scattering loss caused by the roughness of the side face 30A of the ridge structure section 30 can be suppressed. Accordingly, even in the case where the optical waveguide 10 having the curved section 10A with the small curvature is used, it is possible to suppress the optical loss reliably, thus enabling the optical modulator to be miniaturized. Furthermore, since the perpendicularity of the side face of the ridge is improved as described in the above, it becomes possible to reduce a drive voltage for the optical modulator, and also possible to perform the designing for matching propagation speeds of light and microwave.

Here, in the above embodiment, the polarization inversed regions R each having the length of L/2, are formed in the central part of the interaction portion in the longitudinal direction, to reduce the wavelength chirp. However, the areas where the polarization inversed regions R are formed are not limited to the central part of the interaction portion, and it is possible to make the wavelength chirp almost zero similarly even if the polarization inversed regions R are formed in the longitudinal direction in the first half (incoming side), or end half (outgoing side) of the interaction portion. However, in general, it has been known that a transmission loss of electrical signal given to a coplanar line is increased, as the frequency thereof is made high. Therefore, in the case where the microwave M is given to the signal electrode 21 of the coplanar electrode 20 to drive the present optical modulator at a higher speed, the intensity of the microwave M is attenuated with the traveling of the microwave M along the signal electrode 21, so an interaction state of the microwave M with the lights being propagated through the parallel waveguides 13A and 13B is changed on the incoming side and the outgoing side. Accordingly, in the configuration in which the polarization inversed regions R are arranged on the incoming side or the outgoing side as described above, a difference occurs between the phase change of light in the non-inversed regions and the phase change of light in the polarization inversed regions R. Thus, there is a possibility that it is difficult to suppress the occurrence of wavelength chirp. Considering this point, as in the above embodiment, it is desirable to arrange the polarization inversed regions R symmetrically about the central part of the interaction portions in the longitudinal direction.

Figure 4:
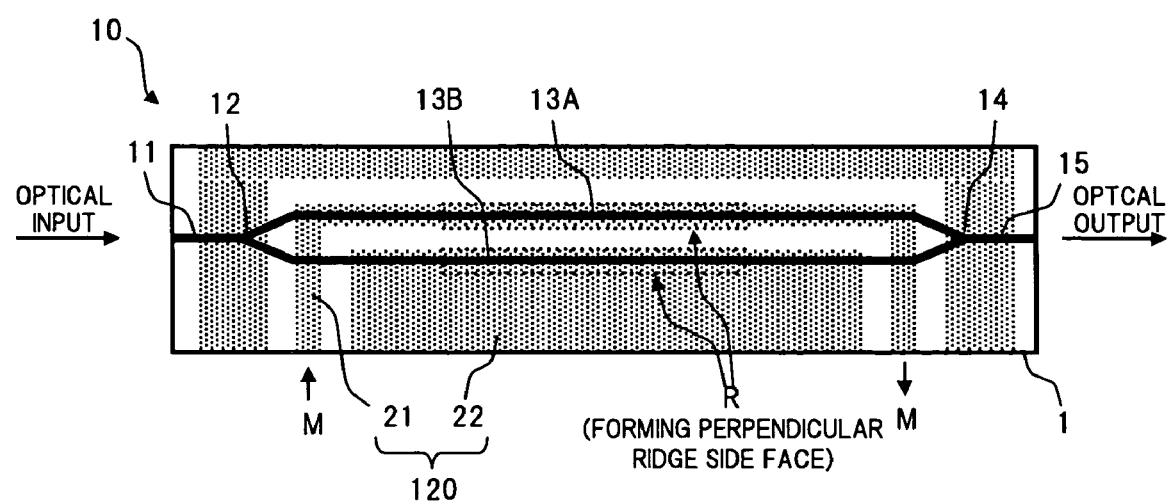
FIG. 4 is a plan view showing a configuration example in which the present invention is applied to a straight type Mach-Zehnder type optical modulator.

Furthermore, in the configuration of the present embodiment, an effect due to the improvement in perpendicularity of the side faces of the ridges described above can be obtained only in the curved section 10A where the polarization inversed regions R are formed. However, as shown in FIG. 4, even if the polarization inversed regions R are provided along the parallel waveguides 13A and 13B to form ridge structure sections in a straight type Mach-Zehnder type optical modulator, it is possible to reduce the drive voltage by approximately 10%, and it is easy to achieve the matching of speeds of lights and microwave, and the impedance matching with an external circuit. Therefore, it is also effective to apply the present invention to the above straight type.

Figure 5:
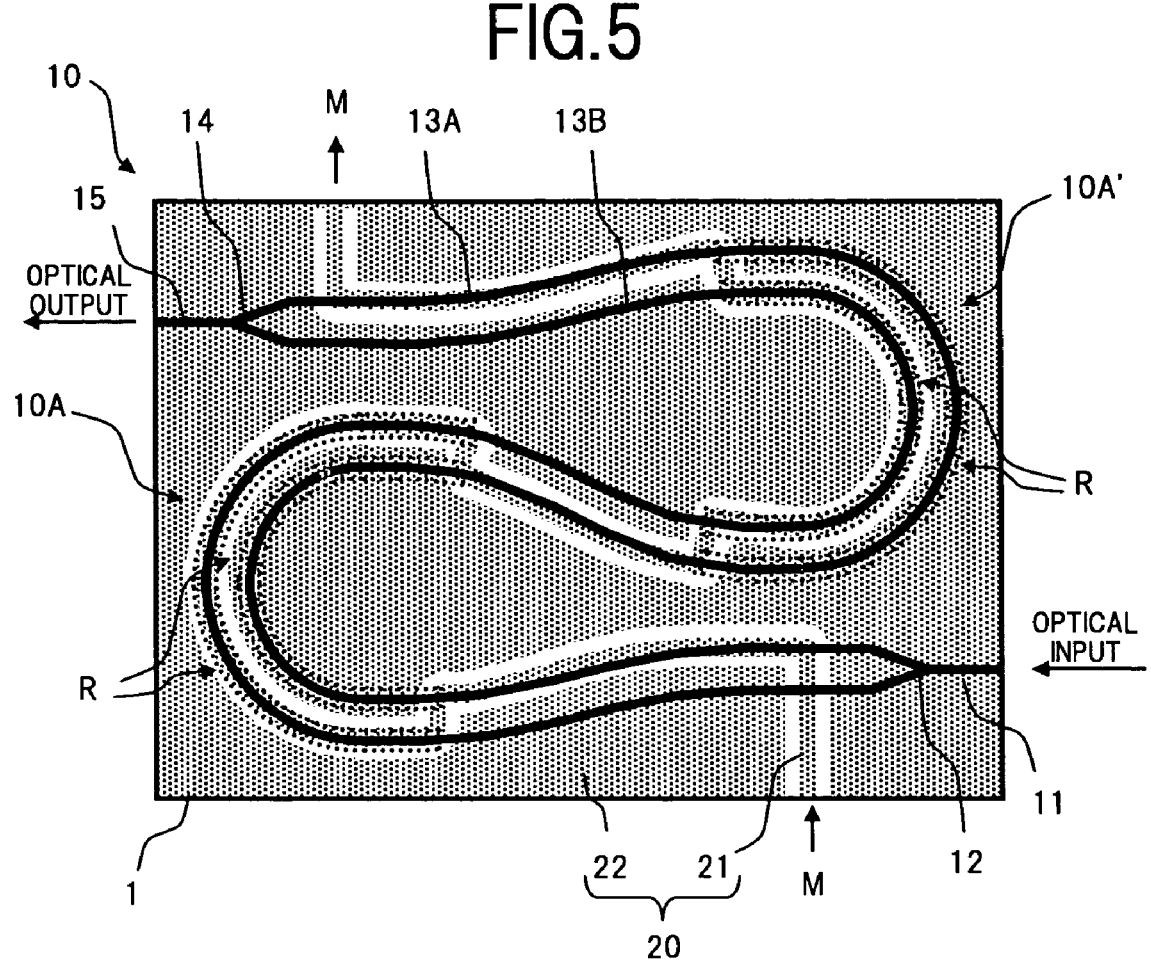
FIG. 5 is a plan view showing a configuration of a modified example of the embodiment.
Figure 6:
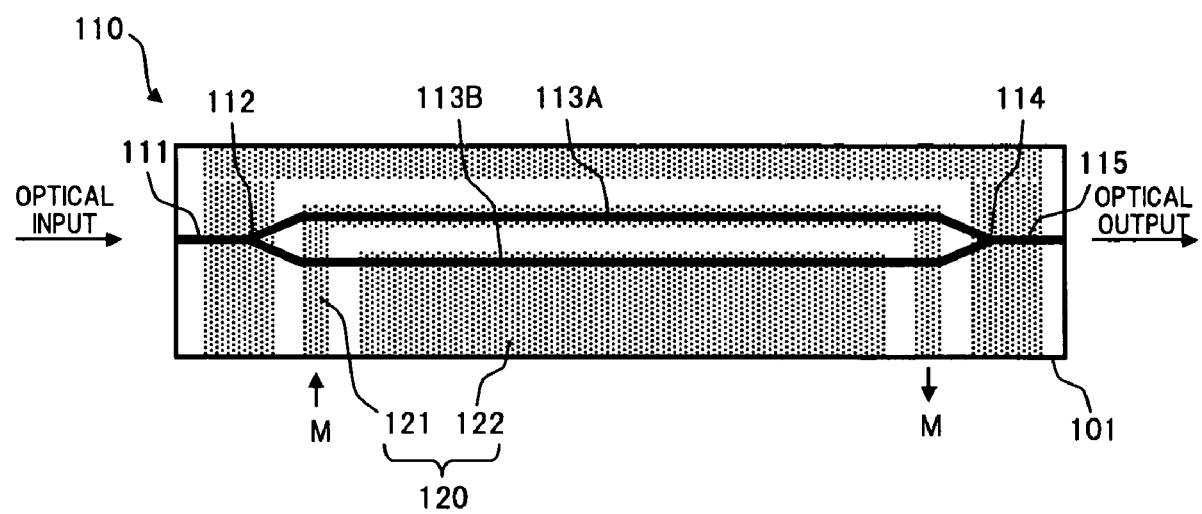
FIG. 6 is a plan view showing a configuration of a typical conventional Mach-Zehnder type optical modulator.

Moreover, in the above embodiment, the approximately U shaped configuration in which the optical waveguide 10 bends around in one place with the angle of 180° has been described as the example. However, the present invention is not limited to this, and as shown in FIG. 5 for example, it is also possible to use an approximately S shaped configuration in which the optical waveguide 10 bends around in two places with an angle of 180°. Therefore, the present invention is effective in any configuration in which bending with an angle of 90° is performed at arbitrary places. By increasing the number of bending of the optical waveguide 10, it is possible to set the length L of the interaction portion to be longer, thus enabling an increase of the regions where the phase can be changed. Furthermore, in the case where the designing is made such that the bending is performed in two or more places to make the length of a chip (length of the substrate 1) 30 mm or less, the number of chips obtained from a 4 inch wafer is increased, which is effective in that an effect in reducing the unit cost of the chips becomes larger. In addition, in the approximately S shaped configuration in FIG. 5, the designing is made such that the polarization inversed regions R are formed in each of two curved sections 10A and 10A', where the bending in the angle of 180° is performed, and the sum of the lengths of the polarisation inversed regions R in the longitudinal direction becomes ½ times the overall length L of the interaction portion. By using such a configuration, the polarization inversed regions R are arranged symmetrically about the central part of the interaction portion in the longitudinal direction. Thus, it is possible to make the wavelength chirp zero over a wide band.

Moreover, in the embodiment and its applied example described above, the signal electrode 21 is arranged above the parallel waveguide 13A in the non-inversed regions, and is arranged above the parallel waveguide 13B in the polarization inversed regions R. However, it is also possible to arrange the signal electrode 21 in the non-inversed regions and the polarization inversed regions R in the manner opposite to the above.

Furthermore, the length L1 of the non-inversed regions and the length L2 of the polarization inversed regions R are almost equal to each other, to prevent the occurrence of wavelength chirp. However, in the case where the electro-optic constant of the polarization inversed regions R is different from the electro-optic constant of the non-inversed regions for example, the length L2 of the polarization inversed regions R may be adjusted depending on the difference, to suppress the occurrence of wavelength chirp. In addition, as an applied example associated with such adjustment of the length of the polarization inversed regions R, in the case where the present optical modulator is applied to a system in which a required value of wavelength chirp is not zero, it is also easy to change the ratio of the length of the non-inversed regions or the polarization inversed regions to the overall length of the interaction portion, according to the required value, so that it is possible to obtain a modulated light where the desired wavelength chirp occurred.

What is claimed is:

1. An optical modulator of Mach-Zehnder type in which an optical waveguide with a structure of a Mach-Zehnder interferometer is formed on a substrate having an electro-optical effect, a signal electrode and a ground electrode are disposed along a pair of waveguides positioned between a branching section and a multiplexing section of said optical waveguide, and lights being propagated through said optical waveguide are modulated by applying an electrical signal to said signal electrode, said substrate including:

a polarization inversed region, which is formed by inversing a direction of polarization of a part of a region relative to a direction of polarization of another part of the region, in an interaction portion where the lights being propagated through said pair of waveguides and the electrical signal being propagated through said signal electrode interact; and ridge structure sections formed by lowering areas of the substrate on both sides of each of said pair of waveguides along the waveguides, and said signal electrode being arranged in the vicinity of one of said pair of waveguides in the polarization inversed region of said interaction portion, and is arranged in the vicinity of the other waveguide in a non-inversed region of the interaction portion where the polarity is not inversed.

2. An optical modulator according to claim 1, wherein said optical waveguide contains a curved section with a return angle of 90° or more in a portion corresponding to said interaction portion, and said ridge structure section is formed in at least an area corresponding to said curved section on the surface of said substrate.

3. An optical modulator according to claim 2, wherein said optical waveguide contains said curved section in two or more places.

4. An optical modulator according to claim 2, wherein said polarization inversed region is formed in a region corresponding to said curved section, in said interaction portion.

5. An optical modulator according to claim 2, wherein a center position of said optical waveguide is arranged to shift from the center of said ridge structure section in a direction perpendicular to a propagation direction of light.

6. An optical modulator according to claim 1, wherein in said substrate, said optical waveguide is formed on a surface of a Z-cut crystal substrate, and the surface on which said optical waveguide is formed, has a +Z face in said polarization inversed region and a −Z face in said non-inversed region.

7. An optical modulator according to claim 6, wherein said ridge structure is formed in a condition where a side face of a portion thereof corresponding to said polarization inversed region is approximately perpendicular to the surface of said substrate.

8. An optical modulator according to claim 1, wherein a buffer layer with a lower refractive index than a refractive index of said substrate is formed on at least a side face of said ridge structure section.

9. An optical modulator according to claim 1, wherein said polarization inversed region has the length of approximately ½ times the overall length of said interaction portion in propagation directions of the lights in said pair of waveguides, and has the length approximately equal to the width of said ridge structure section in a direction perpendicular to said propagation directions of the lights.

10. An optical modulator according to claim 1, wherein said substrate is a lithium niobate substrate.

11. An optical modulator according to claim 1, wherein said signal electrode is arranged such that a center of its width in a direction perpendicular to a propagation direction of the electrical signal, coincides with the center of said ridge structure section positioned below.

12. An optical modulator according to claim 1, wherein said ridge structure section is formed in a tapered shape with the ridge width gradually changing, in parts thereof in proximity with the branching section and the multiplexing section of said optical waveguide.

13. An optical modulator according to claim 1, wherein said polarization inversed region is arranged in positions symmetrical about a center in a propagation direction of light of said interaction portion.

14. An optical modulator according to claim 1, wherein said polarization inversed region has the length set according to a required value for wavelength chirp in propagation directions of the lights in said pair of waveguides, and has the length approximately equal to the width of said ridge structure section in a direction perpendicular to said propagation directions of the lights.

15. An optical modulator in which a pair of optical waveguides for an interferometer is formed on a substrate having an electro-optical effect, a signal electrode and a ground electrode are disposed to cover said optical waveguides positioned between a branching section and a multiplexing section, and lights being propagated through said optical waveguides are modulated by applying an electrical signal to said signal electrode, said substrate including:

a polarization inversed region, which is formed by inversing a direction of polarization of a part of a region relative to a direction of polarization of another part of the region, in an interaction portion where the lights being propagated through said optical waveguides and the electrical signal being propagated through said signal electrode interact; and ridge structure sections formed by lower areas of the substrate on both sides of one of said optical waveguides covered by said signal electrode, and said signal electrode is arranged to cover one of said optical waveguides in the polarization inversed region of said interaction portion, and is arranged to cover the other optical waveguide in a non-inversed region of the interaction portion where the polarity is not inversed.

16. An optical modulator according to claim 15, wherein said optical waveguides contain a curved section with a return angle of 90° or more in a portion corresponding to said interaction portion, and said ridge structure section is formed in at least an area corresponding to said curved section on said substrate.

17. An optical modulator according to claim 16,
wherein said optical waveguide contains said curved section in two or more places.

18. An optical modulator according to claim 16,
wherein said polarization inversed region is formed in a region corresponding to said curved section, in said interaction portion.

19. An optical modulator according to claim 16,
wherein a center position of said optical waveguide, is arranged to shift from the center of said ridge structure section in said curved section.

20. An optical modulator according to claim 15,
wherein in said substrate, said optical waveguide is formed on a surface of a Z-cut crystal substrate, and the surface on which said optical waveguide is formed, has a +Z face in said polarization inversed region and a −Z face in said non-inversed region.

21. An optical modulator according to claim 20,
wherein said ridge structure is formed in a condition where a side face of a portion thereof corresponding to said polarization inversed region is approximately perpendicular to the surface of said substrate.

22. An optical modulator according to claim 15,
wherein a buffer layer with a lower refractive index than a refractive index of said substrate is formed on at least a side face of said ridge structure section.

23. An optical modulator according to claim 15,
wherein said polarization inversed region has the length of approximately one-half times the overall length of said interaction portion in propagation directions of the lights in said optical waveguides, and has the length approximately equal to the width of said ridge structure section in a direction perpendicular to said propagation directions of the lights.

24. An optical modulator according to claim 15,
wherein said substrate is a lithium niobate substrate.

25. An optical modulator according to claim 15,
wherein said signal electrode is arranged such that a center of its width in a direction parallel to the surface of said substrate and perpendicular to a propagation direction of the electrical signal, coincides with the center of said ridge structure section positioned below.

26. An optical modulator according to claim 15,
wherein said ridge structure section is formed in a tapered shape with the ridge width gradually changing, in parts thereof in proximity with the branching section and the multiplexing section of said optical waveguide.

27. An optical modulator according to claim 15,
wherein said polarization inversed region is arranged in positions symmetrical about a center in a propagation direction of light of said interaction portion.

28. An optical modulator according to claim 15,
wherein said polarization inversed region has the length set according to a required value for wavelength chirp in propagation directions of the lights in said optical waveguides, and has the length approximately equal to the width of said ridge structure section in a direction perpendicular to said propagation directions of the lights.

29. An optical modulator having a pair of optical waveguides and a signal electrode, formed on a substrate, said substrate including:
a polarization inversed region, which is formed by inversing a polarization direction of a part of a region relative to a polarization direction of another part of the region, in an interaction portion where the lights being propagated through the optical waveguides and the electrical signal being propagated through the signal electrode interact; and
ridge structure sections formed by lower areas of the substrate on both sides of one of said optical waveguides, and
said signal electrode being arranged to cover one of said optical waveguides in the polarization inversed region of the interaction portion, and being arranged to cover the other optical waveguide in a non-inversed region of the interaction portion where the polarity is not inverted.

* * * * *

UNITED STATES PATENT AND TRADEMARK OFFICE
CERTIFICATE OF CORRECTION

PATENT NO. : 7,088,875 B2
APPLICATION NO. : 10/872404
DATED : August 8, 2006
INVENTOR(S) : Masaki Sugiyama et al.

It is certified that error appears in the above-identified patent and that said Letters Patent is hereby corrected as shown below:

Title Page Column 1 Item [75] (Inventors), Line 7, After "Zama (JP)" delete ";".

Signed and Sealed this

Ninth Day of January, 2007

JON W. DUDAS
*Director of the United States Patent and Trademark Office*